United States Patent [19]

Horowitz et al.

[11] 3,863,222

[45] Jan. 28, 1975

[54] TONE SIGNAL SWITCHING SYSTEM

[76] Inventors: Irving Horowitz, 18 Farm Ln., Eatontown, N.J. 07724; John W. Baker, 1317 Stony Brook Ln., Mountainside, N.J. 07092

[22] Filed: Dec. 19, 1973

[21] Appl. No.: 426,340

[52] U.S. Cl. .................... 340/171 PF, 179/84 VF

[51] Int. Cl. .................... H04m 11/00, H04q 1/45

[58] Field of Search ...... 340/171 R, 171 PF, 171 A; 179/84 VG; 325/64, 432, 460, 307, 334

[56] References Cited

UNITED STATES PATENTS

| | | | |
|---|---|---|---|
| 3,076,059 | 1/1963 | Meacham et al. | 179/84 VF |
| 3,281,790 | 10/1966 | Roscoe | 340/171 R |
| 3,573,376 | 4/1971 | Bartlett | 179/84 VF |

*Primary Examiner*—Donald J. Yusko
*Attorney, Agent, or Firm*—Bernard Malina

[57] ABSTRACT

A touch-tone type switching apparatus for routing multiple audio/video signals to multiple users on an unlimited access remote selection basis utilizes a touch-tone switch pad feeding a bank of demodulators and AND gates for each user control station and a single bank of local oscillators feeding all the demodulator banks at all the user control stations in a superheterodyne signal processing system. This system thus eliminates separate banks of filters for each user control station in conventional switching systems.

8 Claims, 4 Drawing Figures

TONE SIGNAL SWITCHING SYSTEM

BACKGROUND OF THE INVENTION

The present invention relates to signal switching apparatus and more particularly to switching apparatus for routing multiple audio/video signals to multiple users on an unlimited access remote selection basis.

Presently known touch-tone type switching apparatus for routing multiple audio/video signals to multiple users, such as that shown in FIG. 1 of the drawings generally require a bank of seven filters for each control station in the switching apparatus. In such a touch-tone type of switching apparatus with many user control stations these filters introduce considerable bulk and cost to the overall system as well as an elements of unreliability to the system due to the necessity of tuning these filters to the appropriate frequencies. The signal routing switching apparatus of the present invention reduces the bulk and cost of such signal routing switching apparatus by eliminating such filters (and the need for tuning thereof) by using a super-heterodyne type of circuit with a 15HZ I.F. (intermediate frequency). A single bank of 7 local oscillators feeding the first user control station may be shared with a plurality, e.g., 20 control stations thereby conserving space and cost. The touch-tone pad for each user station may be of the standard telephone type.

It is therefore a general object of the present invention to provide an audio/video switching apparatus of improved reliability and reduced bulk and cost.

It is a further object of the present invention to provide audio/video switching apparatus in accordance with the foregoing object which is adaptable for use with the standard telephone type of "touch-tone" pad.

BRIEF DESCRIPTION OF THE INVENTION

In accordance with the principles of the present invention there is provided signal routing switcher apparatus for a plurality of user control stations. At each of the user control stations there is provided switch means having a plurality of switch positions, tone signal generator means operative in response to the actuation of the switch means to a selected switch position to produce first and second component tone signals representative of the selected switch position, and a bank of demodulators respectively corresponding to each of the tone signals producible by the tone signal generator means. A single bank of local oscillators feed local oscillator signals to one input of the corresponding demodulator at each of the user control stations. The tone signal generator means at each user control station feeds its tone signals to the second input of the corresponding demodulator at the same user control station. A bank of AND gates respectively corresponding to the various switch positions is provided at each user control station and is fed by the two demodulators at its user control station which correspond to the first and second tone signals representing the selected switch position at said user control station.

Further objects, features and advantages of my invention will become apparent upon consideration of the following detailed description in conjunction with the drawings, in which:

DETAILED DESCRIPTION OF THE INVENTION

Figure 1:
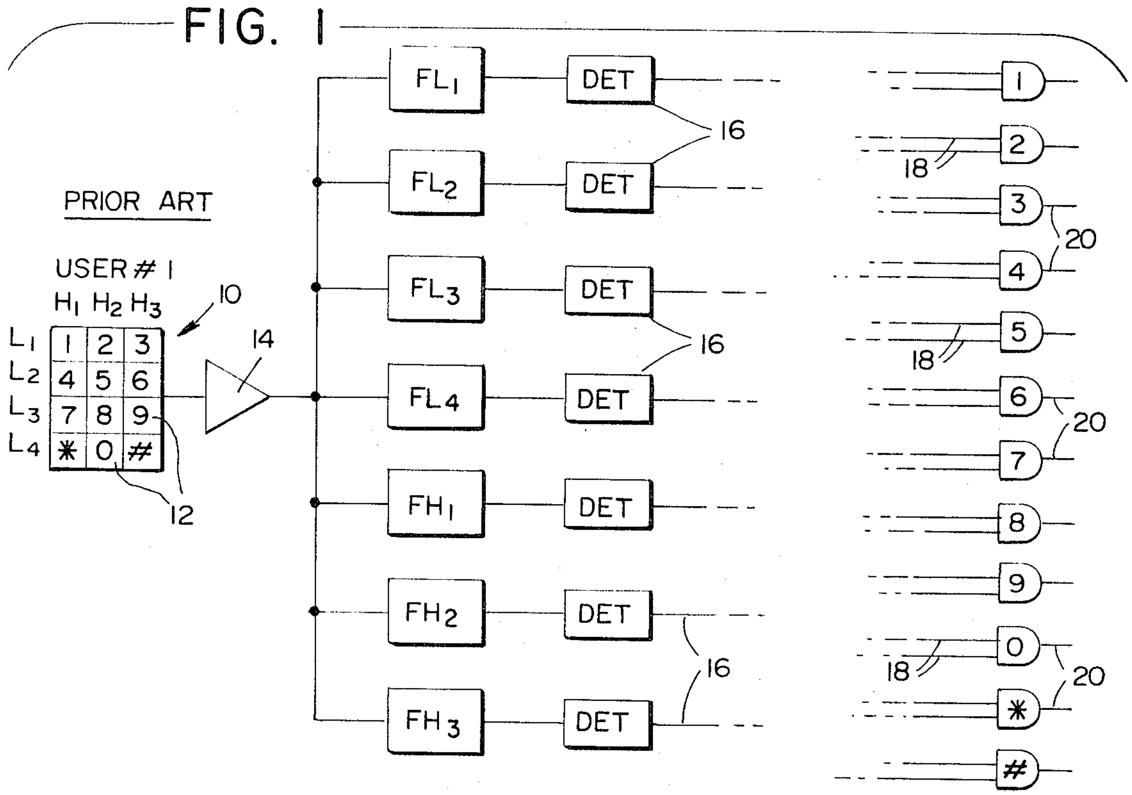
FIG. 1 is a functional block diagram of a prior art type of switching apparatus for routing multiple signals to multiple users.

Referring to the drawings and in particular to FIG. 1 thereof, a prior art signal routing switching apparatus is seen to comprise a standard telephone-type "touch-tone" pad 10, comprising twelve buttons 12 and wherein depression of a single button 12 produces two simultaneous audio frequencies (i.e., tones) representing the L and H frequencies. These tones are fed to an input amplifier 14 where the tones are amplified and applied to a bank of tone filters $FL_1$, $FL_2$, $FL_3$, $FL_4$, $FH_1$, $FH_2$, and $FH_3$. Thus, for example, if the number 8 button is depressed, the two simultaneous tones will comprise the audio frequencies of $L_3$ and $H_2$ and, accordingly, filters $FL_3$ and $FH_2$ will produce outputs which are detected by the corresponding detectors 16 to produce a pair of input signals on the input terminals 18 of AND gate "8" thereby obtaining an output signal at its output terminal 20. It will be appreciated, however, that in the system of FIG. 1, each user control station requires a duplication of the circuitry shown in FIG. 1, i.e., each user control station requires its own bank of 7 filters $FL_1$, – $FH_3$, each filter thereof requiring individual tuning thereby decreasing the reliability and significantly increasing the bulk and cost of the system.

Figure 2:
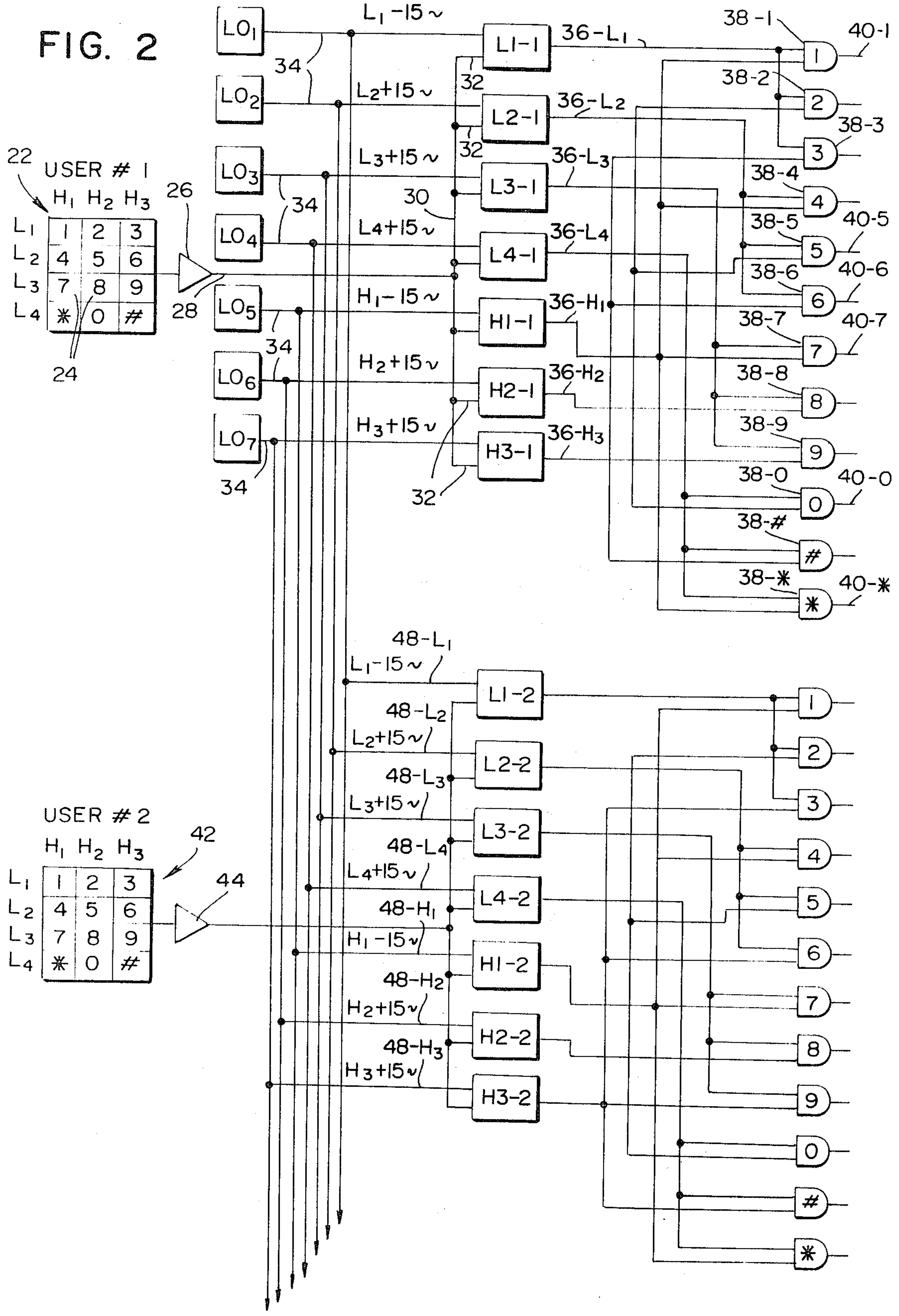
FIG. 2 is a functional block diagram of signal routing switching apparatus in accordance with the principles of the present invention in one embodiment thereof.

Referring to FIG. 2, in the signal routing switching apparatus of the present invention, the filter system of the prior art switching apparatus of FIG. 1 is replaced by a superheterodyne type circuit comprising a bank of local oscillators $LO_1$, $LO_2$, – $LO_7$ which produce an output signal having a frequency which, e.g., is 15HZ above or below the tone frequencies $L_1$, $L_2$, $L_3$, $L_4$, $H_1$, $H_2$, and $H_3$ produced by the standard telephone-type touch-tone pad 22 as indicated on the output leads of the local oscillators $LO_1$, $LO_2$, – $LO_7$.

Referring to FIG. 2, in user control station No. 1, depression of a single button 24 of the standard telephone touch-tone pad 22 produces two simultaneous audio frequency tones. Thus, depression of the number 6 button will simultaneously produce the $L_2$ and $H_3$ frequency tones which are fed to input amplifier 26 which serves to amplify these tones. Input amplifier 26 applies the amplified tones via its output lead 28 and jumper lead 30 to each of the demodulators L1-1, L2-1, L3-1, L4-1, H1-1, H2-1 and H3-1 at one of the input leads 32 thereto. The other local oscillator output leads 34-$L_1$, 34-$L_2$, etc. respectively connected to demodulators L1-1, L2-1, – H3-1, carry the local oscillator signals at the frequencies indicated on the leads 34-$L_1$, 34-$L_2$, etc.

Although the $L_2$ and $H_3$ tones produced by depressions of the number 6 button are applied via leads 28 and 32 to all of the demodulators L1-1, L2-1, – H3-1, only demodulators L2-1 and H3-1 will respond thereto to produce D.C. level signals at their respective output leads 36-$L_2$ and 36-$H_3$. As shown in FIG. 2, output leads 36-$L_2$ and 36-$H_3$ are connected to the dual input of AND gate No. 6 whereby the two D.C. output signals from demodulators L2-1 and H3-1 are applied to AND gate 38-6 representing the number 6 which produces a D.C. output signal at its output lead 40-6 thereby converting the tone information from touch-tone pad 22 into decimal information. The D.C. output signals from AND gate output leads 40-6 is fed to suitable logic circuitry (not shown) to perform further switching functions.

Referring again to FIG. 2, the user control station No. 2 and subsequent control stations (not shown) include a touch-tone pad 42, an input amplifier 44 and a bank of demodulators L1-2, L2-2, – H3-2, all of which are similar to the corresponding touch-tone pad 22, amplifier 26, and demodulators L1-1, L2-1, – H3-1 associated with user control station No. 1. However, instead of providing a bank of local oscillators for user control station No. 2, local oscillators $LO_1$, $LO_2$, –$LO_7$ are shared by user control station No. 2 and subsequent user control stations (not shown). This sharing is accomplished by having the output leads 34-$L_1$, 34-$L_2$, etc, respectively connected by leads 46 to the corresponding input leads 48-$L_1$, 48-$L_2$ – 48-$H_3$ of demodulators L1-2, L2-2, – H3-2 of user control station No. 2. In this way, a single bank of local oscillators $LO_1$, $LO_2$, etc., feeds the corresponding banks of demodulators of multiple user control stations, where a typical signal routing switching system may comprise twenty user control stations thereby effecting substantial reductions in bulk and cost of the switching system.

Figure 3:
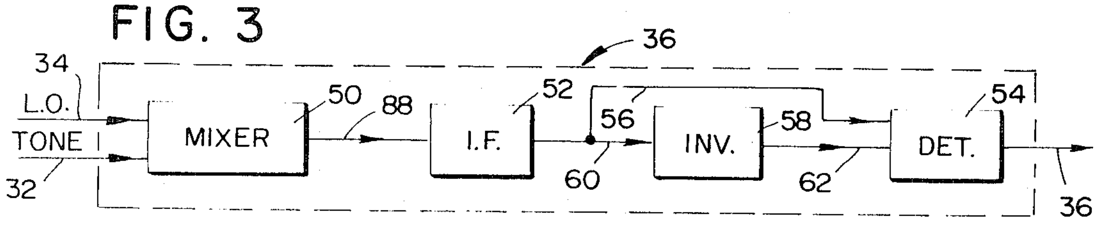
FIG. 3 is a functional block diagram of the demodulators in FIG. 1.

Referring to FIG. 3, each of the demodulators in FIG. 2 comprise a mixer 50 having a pair of inputs to which are applied the local oscillator and tone signals at their output leads 52 and 32 respectively. The tone frequencies applied to the various demodulators in FIG. 2 are either 15HZ above or below the corresponding tone frequencies as indicated on leads 34. Mixer 50 produces a difference frequency signal of 15HZ which is applied to I.F. amplifier 52 where this difference frequency signal is amplified and fed directly to detector circuit 54 via lead 56 and to inverter stage 58 via lead 60. Inverter 58 produces an output signal which is 180° out-of-phase with and equal in magnitude to the difference frequency signal applied thereto at lead 60 to detector 54 at input lead 62. Detector 54 is operative to produce full wave rectification of the I.F. signals applied thereto at input leads 56 and 62 to produce a *dc*., signal at its output lead 36 which is applied to the appropriate AND gate 38 as shown in FIG. 2.

Figure 4:
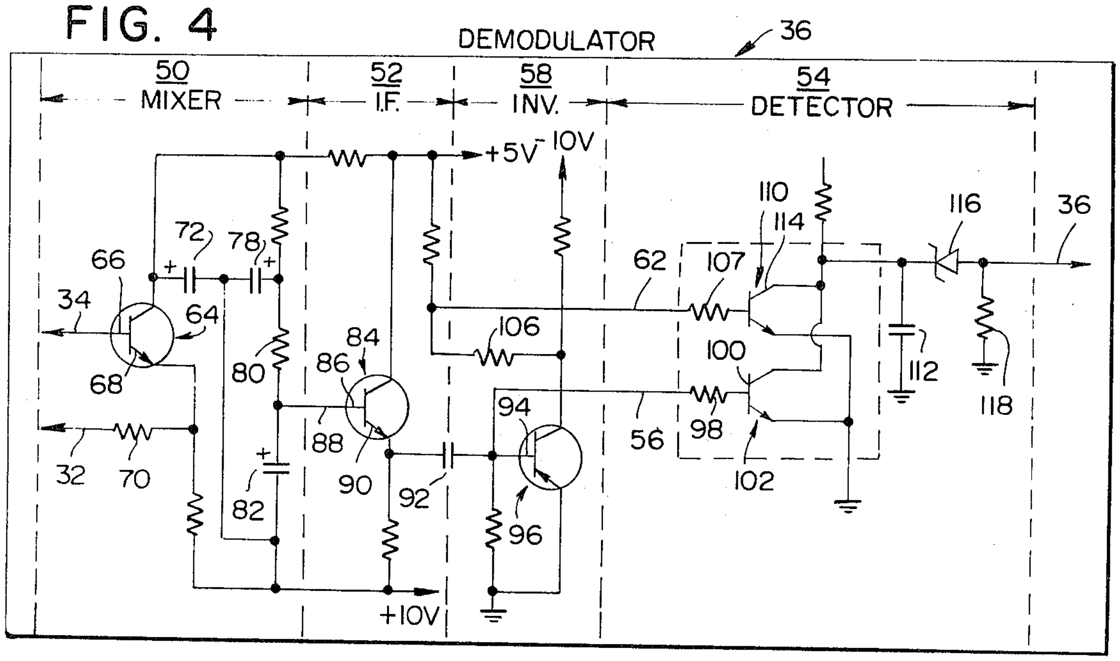
FIG. 4 is a schematic diagram of the demodulator of FIG. 3.

Referring to FIG. 4 mixer 50 comprises a transistor having the local oscillator signal applied to its base 66 via lead 34 and the tone signal applied to its emitter 68 via lead 32 and resistor 70.

Mixer 50 includes a capacitor 72 and a resistor 74 connected at one of their ends thereof to collector 76 and a capacitor 78 interconnecting the other ends of capacitor 72 and resistor 74. A resistor 80 has one of its ends connected to the junction of capacitor 78 and resistor 74 and a capacitor 84 is connected at one end to the junction of capacitors 72 and 78 and at its other end to resistor 80.

I.F. amplifier 52 comprises a transistor 84 wherein the output of mixer 50 taken at the junction of reactor 80 and capacitor 82 is applied to the base 86 thereof via lead 88. The output of I.F. amplifier 52 is taken from emitter 90 and applied via coupling capacitor 92 to the base 94 of transistor 96 in inverter 58. The output of I.F. amplifier 52 is also applied, via lead 56 and input resistor 98, to the base 100 of transistor 102 in detector 54. The output of inverter 58 is taken from the collector 104 via resistor 106, and lead 62 and is applied through resistor 107 to the base 108 of transistor 110 in detector 54. A capacitor 112 is connected from the collector 114 to ground and a zener diode 116 is connected at one end to collector 114 and to resistor 118, the other end of which is connected to ground. The output of detector 54 is taken from the junction of zener diode 116 and resistor 118 and is applied via lead 36 to the appropriate AND gate 38 as shown in FIG. 2.

Although the invention has been described with reference to a particular embodiment thereof, it is to be understood that this embodiment is merely illustrative of the application of the principles of the invention. Numerous modifications may be made therein and other arrangements may be devised without departing from the spirit and scope of the invention.

What is claimed is:

1. Signal routing switching apparatus comprising switch means having a plurality of switch positions, tone signal generator means operative in response to the actuation of said switch means to selected switch positions to produce first and second component tone signals representative of each of said selected switch position, a plurality of local oscillators respectively operative to produce at their respective outputs, local oscillator signals corresponding to each of said tone signals producible by said tone signal generator means, a plurality of demodulators respectively corresponding to each of said tone signals producible by said tone signal generator means, each of said demodulators having first and second input and an output, the output of each of said local oscillators being respectively connected to said first input of the corresponding demodulator and the output of said tone signal generator being connected to each of said second input of said demodulators, a plurality of AND gates respectively corresponding to said selected switch positions, each of said AND gates having first and second inputs respectively connected to the output of the demodulator which corresponds to the first and second tone signals representing the selected switch position.

2. Signal routing switching apparatus as defined in claim 1 wherein said first and second component tone signals are substantially coincident in time.

3. Signal routing switching apparatus as defined in claim 1 wherein the respective frequencies of said local oscillator signals respectively differ from the frequencies of the tone signals producible by said tone generator means by a preselected frequency.

4. Signal routing switching apparatus as defined in claim 3 wherein each of said demodulators comprises mixer means having first and second inputs for the application thereto respectively of the corresponding local oscillator signal and the corresponding tone signal, said mixer means being operative to produce at its output a difference frequency signal of a frequency equal to said preselected frequency, I.F. amplifier means having its input connected to the output of said mixer means for amplifying said difference frequency signal, inverter means having its input connected to the output of said I.F. amplifier means for inverting said difference frequency signal, and detector means having first and second inputs respectively connected to the outputs of said I.F. amplifier means and said inverter means for the application thereto of said difference frequency and inverted difference frequency signals and operative to produce in response thereto a dc., signal which is applied to the corresponding AND gates.

5. Signal routing switching apparatus for a plurality of user control stations comprising switch means having a plurality of switch positions at each of said user control stations, tone signal generator means at each of said user control stations, each of said tone signal generator means being operative in response to the actuation of said switch means at the corresponding user control station to a selected switch position, to produce first and second component tone signals representative of each of said selected switch positions, a plurality of local oscillators respectively operative to produce at their respective outputs, local oscillator signals corresponding to each of said tone signals producible by said tone signal generator means, a bank of demodulators at each of each user control stations, said demodulators in each of said banks respectively corresponding to each of said tone signals producible by said tone signal generator means, each of said demodulators in a bank having first and second inputs and an output, the outputs of said local oscillators being respectively commonly connected to the said first input of the corresponding demodulator at each of said user control stations and the output of each said tone signal generator means being connected to each of said second inputs of the demodulators at the corresponding user control station, and a bank of AND gates ate each of said suer control stations, said AND gates respectively corresponding to said selected switch positions at its user control station, each of said AND gates at a user control station having first and second inputs respectively connected to the outputs of the demodulators at said user control station which correspond to the first and second tone signals representing the selected switch position.

6. Signal routing switching apparatus as defined in claim 5 wherein said first and second component tone signals are substantially coincident in time.

7. Signal routing switching apparatus as defined in claim 5 wherein the respective frequencies of said local oscillator signals respectively differ from the frequencies of the tone signals producible by said tone generator means by a preselected frequency.

8. Signal routing switching apparatus as defined in claim 7 wherein each of said demodulators comprises mixer means having first and second inputs for the application thereto respectively of the corresponding local oscillator signal and the corresponding tone signal, said mixer means being operative to produce at its output a difference frequency signal of a frequency equal to said preselected frequency, I.F. amplifier means having its input connected to the output of said mixer means for amplifying said difference frequency signal, inverter means having its input connected to the output of said I.F. amplifier means for inverting said difference frequency signal, and detector means having first and second inputs respectively connected to the outputs of said I.F. amplifier means and said inverter means for the application thereto of said difference frequency and inverted difference frequency signals and operative to produce in response thereto a dc. signal which is applied to the corresponding AND gates.

* * * * *